United States Patent [19]

Engle

[11] 4,386,528

[45] Jun. 7, 1983

[54] METHOD AND MEANS FOR GENERATING PIXEL DATA IN AN ULTRASONIC SCANNING SYSTEM

[75] Inventor: Gary L. Engle, Fair Oaks, Calif.

[73] Assignee: General Electric Company, Rancho Cordova, Calif.

[21] Appl. No.: 290,839

[22] Filed: Aug. 7, 1981

[51] Int. Cl.³ .............................................. G01N 29/00
[52] U.S. Cl. .................................... 73/606; 358/112; 358/138
[58] Field of Search ................. 73/606, 607, 618, 620; 367/7, 11; 358/112, 106, 138, 133; 128/660

[56] References Cited

U.S. PATENT DOCUMENTS

| | | | |
|---|---|---|---|
| 2,921,124 | 1/1960 | Graham | 358/138 |
| 4,172,386 | 10/1979 | Cribbs et al. | 73/618 |
| 4,204,433 | 5/1980 | Cribbs et al. | 73/620 |
| 4,236,221 | 11/1980 | Cribbs et al. | 358/112 |
| 4,310,907 | 1/1982 | Tachita et al. | 358/112 |

*Primary Examiner*—Stephen A. Kreitman
*Attorney, Agent, or Firm*—Flehr, Hohbach, Test, Albritton & Herbert

[57] ABSTRACT

In an ultrasonic sector scanner in which display control data is obtained from beam reflection vectors for controlling television display pixels, missed pixels in a display horizontal scan line between two vectors are filled by interpolating known pixel values in the two vectors. By property weighting the known pixel values an improved picture is presented in a display of a digital scanner system.

10 Claims, 5 Drawing Figures

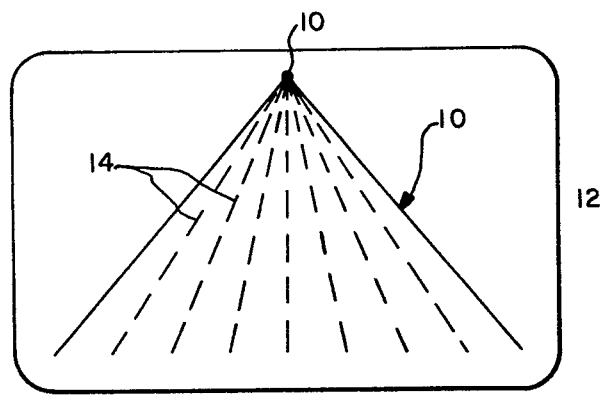
FIG.—1
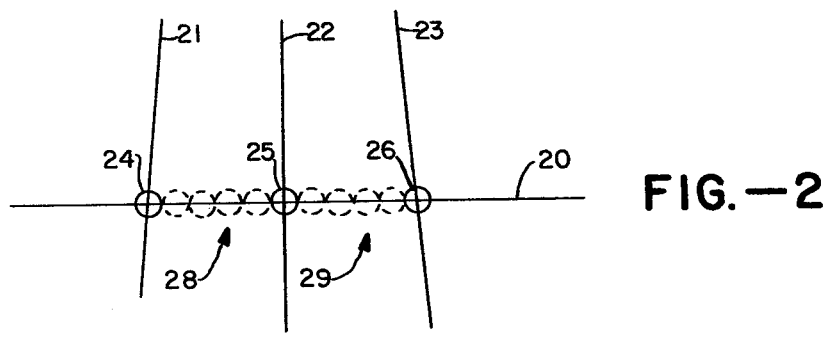
FIG.—2
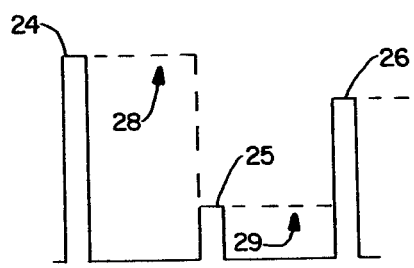
FIG.—3
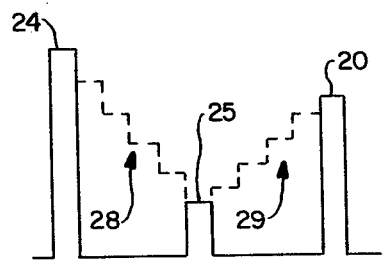
FIG.—4

METHOD AND MEANS FOR GENERATING PIXEL DATA IN AN ULTRASONIC SCANNING SYSTEM

This invention relates generally to video displays such as used in ultrasonic scanners, and more particularly the invention relates to a method and means for generating pixel data for the display in such systems.

Ultrasonic scanning systems are known and commercially available for medical diagnostic purposes. See for example U.S. Pat. No. 4,172,386 for "Video A Trace Display System for Ultrasonic Diagnostic System" and U.S. Pat. No. 4,204,433 for "Computerized Ultrasonic Scanner With Technique Select". The commercially available Datason ultrasonic system of General Electric Company provides both real time and static images on a television display.

Briefly, such systems utilize sound transducers to transmit ultrasonic (e.g. on the order of several megahertz) waves into a patient and to receive echo signals. In one mode of operation, the transducer is attached to a plurality of hinged arms for movement in a single plane, and potentiometers associated with the hinged arms produce signals which identify the transducer in position. Alternatively, a hand held transducer can be employed to generate a real time image. The echo signals are applied to a variable gain amplifier to adjust the echo signals for attenuation when passing through the patient. The adjusted signals are then passed through an analog to digital conversion and video processing circuitry and thence to scan converter circuitry for controlling the body scan display for graphically depicting the ultrasonic pulse echo information. The digital data for controlling the display typically comprises five bits representing a 32 level Gray code of intensity.

The ultrasonic sector scanner generates a pie shaped image of approximately 90°. The display data is generated from a plurality of reflected signals or vectors stemming from the vertex of the pie shaped image. When this data is displayed through a digital scan converter and then on a television monitor, the number of vector lines in the image do not match the number of pixels in the image at a point removed from the apex. Consequently, there are gaps or missed pixels in the image which have to be filled. The number of vector lines in the image could be increased so that there are no missed pixels, however the frame rate would be unacceptably slow. Accordingly heretofore the missed pixels have been left blank, and in an analog display the blanks appear as radial lines from the apex. In a digital display the missed pixels make a fountainlike or moire pattern. Alternatively, a preceding non-zero pixel value can be repeated for all blank pixels until another non-zero value is detected. However, this processing leads to a very blocky image especially in the far field.

Accordingly, a general object of the invention is method and means for improving the display image in an ultrasonic sector scanner system.

Another object of the present invention is an improved method of generating pixel values in an ultrasonic sector scanner.

Another object of the invention is apparatus for filling missed pixels in an ultrasonic sector scanner display and the like.

Still another object of the invention is apparatus for filling missed pixels which is compatible with conventional ultrasonic sector scanner systems.

Briefly, in accordance with the invention data for pixels in a horizontal display line between a first pixel data point and a second pixel data point is obtained by storing the first data value for the first pixel data point, counting the number of intermediate zero data values for pixels until the second pixel data point, and storing the second data value for the second pixel data point. Values for the intermediate pixels are then assigned based on weighted averages for the first data value and the second data value. Accordingly, an improved image is generated by the weighted values assigned to the intermediate pixels thereby giving a more continuous display image.

In accordance with one feature of the invention when the number of zero value intermediate pixels exceeds a preselected number, the value of the second pixel data point is set to zero, and the weighted values of the intermediate pixels are determined therefrom.

The invention and objects and features thereof will be more readily apparent from the following detailed description and appended claims when taken with the drawings, in which:

FIG. 1 is an illustration of an ultrasonic sector scanner display.

FIG. 2 is an enlarged portion of the display of FIG. 1 illustrating a horizontal display line and a plurality of sector scan vectors and pixel data points therebetween.

FIG. 3 is a graphic illustration of the weighting of pixel values intermediate the vectors of FIG. 2 in accordance with the prior art.

FIG. 4 is an illustration of the weighting of pixel values intermediate vectors of FIG. 2 in accordance with the present invention.

Figure 5:
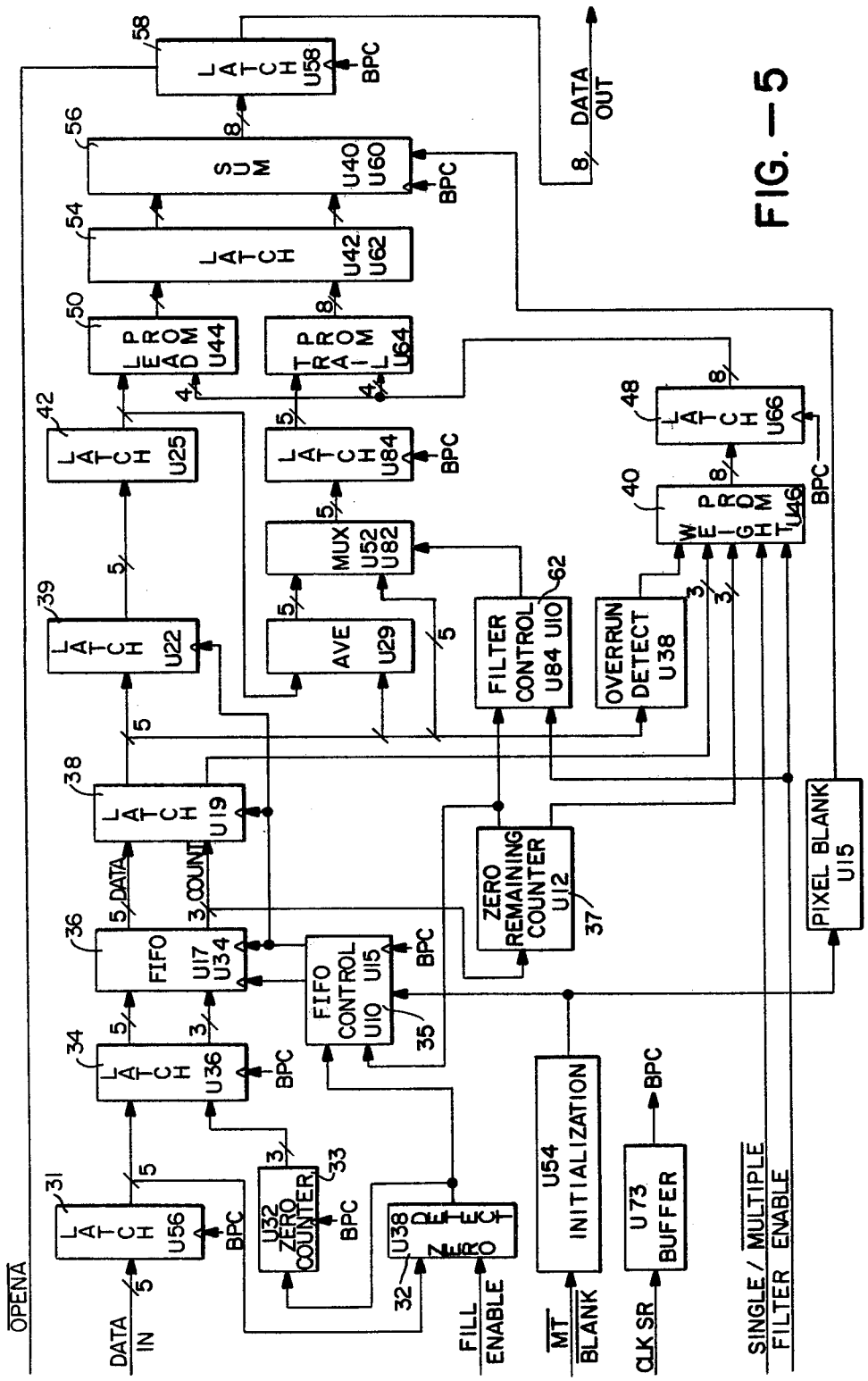
FIG. 5 is a functional block diagram of one embodiment of apparatus in accordance with the invention.

Referring now to the drawings, FIG. 1 illustrates an image 10 on a video display of an ultrasonic sector scanner system. Typically, the image is pie shaped with a plurality of vectors 14 extending from an apex 16. Data points on the vectors 14 are applied through analog to digital conversion and video processing circuitry to control the illumination of pixels in the horizontal scan lines of the video display 12. In a television monitor the display image is defined by 525 horizontal lines with each line having approximately 500 pixels. In conventional ultrasonic scanning apparatus a 32 level Gray code is employed to weigh the data in accordance with a reflected signal intensity. Thus, each pixel can be controlled to one of 32 illumination values.

FIG. 2 is an enlarged view of one horizontal scan line 20 with three vectors 21, 22, and 23 crossing the horizontal line 20 at the pixels 24, 25, and 26, respectively. Thus, each of the pixels 24–26 has a known value from the vector lines 21–23 generated by the sector scanner. However, at a position in the image 10 removed from the apex 16 a number of missed pixels 28 and 29 lie between the vectors 21–22 and 22–23, respectively. As above described, if left blank these missed pixels make a fountainlike or moire pattern. One prior art solution is illustrated in FIG. 3 in which a non-zero value of pixel 24 is duplicated across all blank pixels, to the next non-zero, leading to a very digital and blocky image especially in the far field.

FIG. 4 illustrates the method of establishing weighted values for the missed pixels in accordance with the present invention. In this embodiment the known values at pixels 24 and 25 are weighted to obtain values for the missed pixels 28, and the known values of the pixels 25 and 26 are used to establish weighted values for the missed pixels 29. Accordingly, a smoother image is presented on the display.

Apparatus in accordance with the invention is readily accommodated in conventional rectangular digital scan converter apparatus. FIG. 5 is a functional block diagram of one embodiment of apparatus for filling missed pixels using weighted values of known pixels in accordance with the invention.

A pipeline processing method is employed to obtain the necessary performance with standard commercially available integrated circuits. A system clock for the circuit is generated by buffering the pixel rate signal CLKSR. Input data is buffered by latch 31 to align the data with the clock and eliminate any timing problems. This data is then monitored by the zero detect block 32 which holds a zero counter 33 reset while the input is non-zero. The counter is incremented when zeroes are detected, once for each successive zero until another non-zero value is encountered. At each clock the current data and zero count are strobed into latch 34. The counter has a synchronous clear function so that after each sequence of zeroes the next non-zero value will be loaded into latch 34 along with the number of zeroes in the sequence.

A first in-first out (FIFO) register control 35 generates a load pulse only for non-zero data. This data is loaded into a FIFO memory 36 on the same clock cycle that it appears at the output of latch 34. The FIFO memory 36 thus contains only valid data plus the number of zeroes which occur between each pair of known values. However, when a sequence contains more than a preselected number of successive zeroes (e.g. seven) the zero counter resets to zero and the FIFO control 35 generates a load clock thereby placing a value of zero and count of seven in the FIFO memory 36.

The apparatus is reinitialized at the start of each horizontal display scan line by the MT BLANK interval. During this 14 clock cycle period input data is loaded into FIFO memory 36 but the FIFO control 35 does not allow any data to be output from the memory. Thus, the FIFO memory can be nearly full at the end of this reset pulse. If the first data from the line is mostly zeroes, the FIFO memory 36 will not fill so quickly but will still contain sufficient values for proper operation. If the line begins with the sequence of zeroes, the zero detect unit 32 treats them as valid data and sends the data to the FIFO memory 36 to ensure that it will contain sufficient data. Thereafter, on each line zeroes can be detected only after a non-zero value is encountered.

Following the initialization pulse the FIFO control generates an unload pulse at the next pixel clock (BPC) and then at each clock cycle when the content of a zeroes remaining counter 37 is zero. When a non-zero count appears at the FIFO memory 36 output the count is loaded into the counter 37 thereby inhibiting additional unload clocks until the count is decremented to zero. The FIFO data and zero count are strobed into a latch 38 3 at the same time that the zero count is loaded into the zero remaining counter 37. The previous data sample is simultaneously strobed into a latch 39.

At this time all information required to interpolate between two known pixel values is available. The two pixel values are at the outputs of latches 38 and 39, the total number of zeroes between the known pixel values is at latch 38, and the number of locations left to fill is at the output of counter 37. The two counts are input to a weight PROM 40 which controls the percentage of each known value which will be added to obtain the interpolated values. At the next clock the previous pixel value moves to latch 42, becoming lead data, and the current value moves to latch 44 through a MUX 46 becoming trail data. The output of weight PROM 40 is then loaded into latch 48 to drive the lead PROM 50 and trail PROM 52 which use lookup tables to obtain the required percentage of each value for interpolation. The PROMS 50, 52 also transform the 5 bit input data (based on the Gray code) to an 8 bit output for adding.

Latches 38 and 39 are both driven by the unload clock and both latches retain one set of values while the zeroes remaining counter decrements to zero. At each cycle the lead data and trail data are transferred through latch 54 and combined with different weights in summer 56 to produce a smooth transition from one to the other. The output of summer 56 is applied to latch 58.

Following is an example illustrating the operation based on FIG. 2 and the lead data 25, trail data 26, and four intermediate zeroes:

Lead Data (Latch 5) = 10
Trail Data (Latch 6) = 20
Number of Zeros = 4

| Number of Zeros Remaining | Lead Weight | Trail Weight | Lead PROM | Trail PROM | SUM |
|---|---|---|---|---|---|
| 4 | 1.0 | 0 | 10 | 0 | 10 |
| 3 | 0.8 | 0.2 | 8 | 4 | 12 |
| 2 | 0.6 | 0.4 | 6 | 8 | 14 |
| 1 | 0.4 | 0.6 | 4 | 12 | 16 |
| 0 | 0.2 | 0.8 | 2 | 16 | 18 |

Following completion of the weighting for the intermediate zero values, the previous trail data becomes the lead data and is assigned the weight of 1.0.

In one embodiment the vector generation process of the sector scanner never produces a stream of more than 7 zeros. Thus, when the zero counter detects a string of 8 zeros the last zero is loaded into the FIFO memory to indicate that filling should cease. This zero value will be detected by the overrun detector and causes the weight prom to set both weights to zero and force the output to zero. This occurs when the zero is either lead or trail data.

A pixel blank block 64 generates a signal which clears latch 54 during the initialization interval and for eight additional clock cycles, thus ensuring that no invalid data will appear on the display.

A Single Pixel Fill mode can be selected by setting the SINGLE/MULTIPLE input high. The only effect this has on the circuit is to change one address bit in the weight PROM 40. PROM 40 is programmed to fill only single empty pixels when so addressed. When such an isolated zero is received a weight of 0.5 is assigned to the lead data and trail data so that the average value of the surrounding pixels is displayed in place of the zero value. If a sequence of two or more zeros is encountered the weight for both lead data and trail data becomes zero so the output is also zero.

With the FILL ENABLE input set high all pixel filling is inhibited. In this mode the zero detector 32 is disabled and the circuit merely passes all data through unaltered. In this mode the weights are always 1.0 for lead data and zero for trail data.

A simple one dimensional Gaussian filter is provided by setting the FILTER ENABLE input high and enabling the sum and average block 60 and filter control 62. This filter mode can be used in combination with any of the other modes but is automatically disabled any time actual pixel filling is occurring. Thus, it is possible to have filling when required on the image and also average the part that is generated without missing pixels. At any clock cycle the two data values at latches 38 and 42 are averaged by the block 60 which simply adds the two values and shifts the result right one bit. If filling is not occurring at this time the filter control 62 selects the block 60 input to the MUX 46. At the next clock cycle the average is at the output of latch 44 and the data for the pixel between the two which were averaged is at latch 42. In the filter mode the lead weight is 0.67 and the trail weight is 0.33, generating a running weighted average of 3 pixels with the center pixel weighted two-thirds and each of the adjacent pixels weighted one-sixth.

Whenever pixels are being filled the zeros remaining counter 37 has a non-zero value. This is detected by the filter control 62 to select the proper input (latch 38) to the MUX 46. The weight PROM 40 also uses this count to set the proper weights for filling.

The described method for generating pixel data in an ultrasonic scanning system provides a smoother display image. The apparatus is readily implemented using conventional commercially available circuits, and the apparatus is compatible with commercially available sector scanner apparatus such as the G. E. Datason system. While the invention has been described with reference to a specific embodiment, the description is illustrative of the invention and is not to be construed as limiting the invention. Various modifications and applications may occur to those skilled in the art without departing from the true spirit and scope of the invention as defined by the appended claims.

What is claimed is:

1. In an ultrasonic sector scanner and video display in which pixel data for said display are obtained from vectors of ultrasonic wave reflections, a method of obtaining data for pixels in a horizontal display line between a first pixel data point in one vector and a second pixel data point an an adjacent vector comprising the steps of
storing a first value for said first pixel datum point,
counting the number of intermediate zero data values for pixels until said second pixel data point,
storing a second value for said second pixel data point, and
assigning values to said intermediate pixels based on said first value and said second value.

2. The method of obtaining data for pixels as defined by claim 1 wherein said step of assigning values for said intermediate pixels is a weighted average of said first value and said second value.

3. The method of obtaining data for pixels as defined by claim 1 or 2 wherein said step of storing a second value comprises storing a zero value when the number of intermediate zero values exceed a preselected number.

4. In an ultrasonic sector scanner and video display in which pixel data for said display are obtained from vectors of ultrasonic wave reflections, apparatus for obtaining data for pixels in a horizontal display line between a first pixel data point in one vector and a second pixel data point in an adjacent vector comprising
storage means for storing a first value for said first pixel data point,
counter means for counting the number of zero data values for intermediate pixels until said second pixel data point,
storage means for a second value for said second pixel data point, and
means for assigning values to said intermediate pixels based on said first value and said second value.

5. Apparatus as defined by claim 4 wherein said means for assigning values for said intermediate pixels applies a weighted average of said first value and of said second value.

6. Apparatus as defined by claim 4 or 5 wherein said step of storing a second value comprises means for storing a zero value when the number of zero values exceeds a preselected number.

7. Apparatus for assigning values to pixels intermediate two pixels having known values in a horizontal line of a video display comprising
a first latch for receiving sequential pixel data,
a second latch for receiving data from said first latch,
detect and count means operably connected with said first latch for detecting and counting zero value data in said first latch, said second latch being responsive to said detect and count means for storing the number of zero values following a known pixel value,
weighting means for assigning weights to said zero value data based on said known pixel value, and
transfer means for receiving from said second latch and supplying to said weighting means known values and the count of zero value data intermediate said known values whereby said weighting means assigns values to said zero value data based on said known values.

8. Apparatus as defined by claim 7 wherein said transfer means comprises a sequential memory, a zero data counter, a third latch and a fourth latch, said third latch and said fourth latch being sequentially connected to receive a lead known value and a trail known value from said sequential memory.

9. Apparatus as defined by claim 8 wherein said weighting means includes a first means for applying a lead weight factor to said lead data, a second means for applying a trail weight factor to said trail data, said lead weight factor and said trail weight factor being dependent on said zero value data count intermediate said lead data and said trail data.

10. Apparatus as defined by claim 7 or 9 and further including means for storing a zero value data as a known value when said zero value data count exceeds a preselected number.

* * * * *